United States Patent [19]

Diesner

[11] Patent Number: 5,112,420
[45] Date of Patent: May 12, 1992

[54] METHOD OF MAKING TEXTILE LABELS TO BE APPLIED TO GARMENTS

[75] Inventor: Willi Diesner, Murg-Häner, Fed. Rep. of Germany

[73] Assignee: Vaupel Textilmaschinen KG, Wuppertal, Fed. Rep. of Germany

[21] Appl. No.: 497,435

[22] Filed: Mar. 22, 1990

[30] Foreign Application Priority Data

Mar. 30, 1989 [DE] Fed. Rep. of Germany ....... 3910218

[51] Int. Cl.⁵ ..................... D03D 47/40; D03D 47/50; D06C 25/00; B32B 31/00
[52] U.S. Cl. ..................... 156/88; 156/204; 156/259
[58] Field of Search .............. 156/204, 88, 259, 227; 139/387 R; 428/124, 126; 66/172 R

[56] References Cited

U.S. PATENT DOCUMENTS

| 686,993 | 11/1901 | Shumway | 139/387 R |
|---|---|---|---|
| T,926,010 | 9/1974 | Elliott et al. | 156/204 X |
| 1,559,505 | 10/1925 | Currie | 66/172 R |
| 2,093,187 | 9/1937 | Burke et al. | 139/387 R |
| 2,194,038 | 3/1940 | Wallace, Jr. | 139/387 R |
| 2,250,261 | 7/1941 | Goldsmith | 139/387 R |
| 2,266,459 | 12/1941 | Gilbert | 156/227 |
| 2,744,844 | 5/1956 | Wood, Jr. et al. | 156/88 X |
| 2,753,287 | 7/1956 | Thomson | 156/227 |
| 3,184,930 | 5/1965 | Breitinger | 66/200 |
| 3,854,917 | 12/1974 | McKinney et al. | 156/227 X |
| 3,972,768 | 8/1976 | Hill | 428/126 X |
| 4,015,641 | 4/1977 | Goff, Jr. et al. | 139/387 R X |
| 4,124,420 | 11/1978 | Pastorelli et al. | 156/88 |
| 4,500,372 | 2/1985 | Mion | 156/88 X |
| 4,560,427 | 12/1985 | Flood | 156/88 X |
| 4,699,678 | 10/1987 | Mims | 156/88 |

FOREIGN PATENT DOCUMENTS 2100835 7/1972 Fed. Rep. of Germany .
55-124618 9/1980 Japan ..................... 156/259

Primary Examiner—Michael W. Ball
Assistant Examiner—Adrienne C. Johnstone
Attorney, Agent, or Firm—Peter K. Kontler

[57] ABSTRACT

Chains of coherent labels for use on garments are obtained by severing a running web of woven or knit textile material with heated wires so that the web yields two or more elongated strips having a width exceeding the width of a label. The strips are advanced under tension, and their marginal portions are folded over the adjacent zones of central portions of the respective strips. The thus folded marginal portions are thereupon bonded (particularly heat-sealed) to the respective central portions. The combined width of two marginal portions matches the difference between the width of a strip and the width of a label. Each strip consists of a series of neighboring labels.

18 Claims, 6 Drawing Sheets

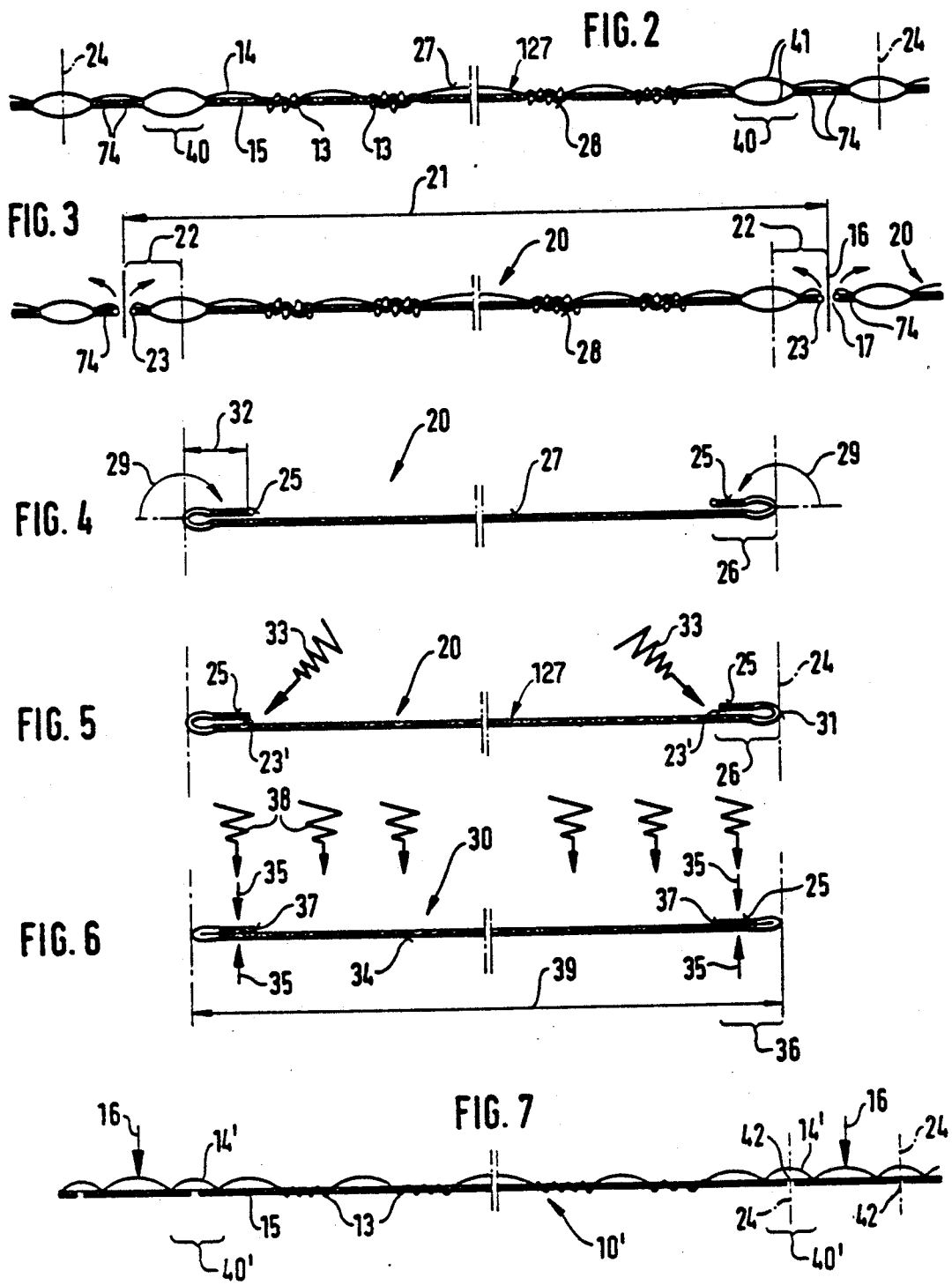

METHOD OF MAKING TEXTILE LABELS TO BE APPLIED TO GARMENTS

BACKGROUND OF THE INVENTION

The invention relates to a method of making strips of textile material, especially for making strips of coherent labels for the application to garments or the like.

Published German patent application No. 21 00 835 discloses a method of making coherent panels by subdividing a web of textile material into a plurality of strips. The subdividing step involves the application of heat to meltable or fusible filaments of the web. Such filaments are often used in recent types of fabrics. In order to prevent fraying of edges of the thus obtained strips, the severing instrumentalities include or constitute heated wires which sever the web by melting its material between the strips and which simultaneously provide the edges of the thus obtained discrete strips with fused beads. The beads are formed in the web making machine ahead of the strip withdrawing unit because the withdrawing unit is apt to damage the edges which are devoid of fused beads.

A drawback of the conventional method is that the making of fused beads unduly hardens and roughens the edges of the strips. In fact, certain fused beads are likely to develop a pronounced toothed profile. This is uncomfortable to the wearer of a garment which is provided with a label forming part of a subdivided strip with fused beads. The beads are likely to damage the garments and/or to bruise the adjacent portions of the skin. All in all, the provision of fused beads along the edges of strips which are to be subdivided into discrete labels is not an ideal solution, not only as concerns the comfort to the wearer of such labels but also as concerns the appearance of the strips and/or labels.

OBJECTS OF THE INVENTION

An object of the invention is to provide a novel and improved method of making strips of coherent labels or the like in such a way that the edges of the strips need not exhibit fused beads or like configurations.

Another object of the invention is to provide a method which renders it possible to avoid fraying of edges of the strips of coherent labels without the formation of fused beads or the like on the ultimate products.

A further object of the invention is to provide a method which renders it possible to produce strips of coherent labels wherein the edges of the labels are devoid of configurations which would be likely to damage the fabric of a garment and/or to bruise the skin of the wearer of the garment in the region of application of the label.

An additional object of the invention is to provide a method which renders it possible to produce large numbers of labels or like panels of textile material in a simultaneous operation and by resorting to a relatively simple, compact and inexpensive apparatus.

Still another object of the invention is to provide a novel and improved method of making and processing webs of textile material into strips of coherent labels or the like.

A further object of the invention is to provide a method which renders it possible to convert a web of textile material into a plurality of strips of coherent panels (e.g., labels for the application to garments and the like) in such a way that each and every portion of the web and each and every portion of each strip is put to use, i.e., that none of the material of the web and/or the strips is wasted.

SUMMARY OF THE INVENTION

The invention resides in the provision of a method of converting an elongated web of filamentary material into chains of coherent panels, particularly labels which are to be applied to garments and have a predetermined width. The improved method comprises the steps of subdividing the web into a plurality of elongated strips each having a width exceeding the predetermined width, two longitudinally extending marginal portions and a central portion having a width which at least approximates the predetermined width, folding the marginal portions of each strip against one side of the respective central portion, and securing the thus folded marginal portions of each strip to the respective central portion. The material of the web is preferably meltable or fusible in response to heating, at least in the regions of marginal portions of the strips, and the subdividing step then preferably comprises heating the web in the regions of the marginal portions at least close to the melting point of their material. The securing step of such method can include bonding the folded marginal portions of each strip to the respective central portion, and such bonding step can include heat-sealing the folded marginal portions of each strip to the respective central portion and/or employing an adhesive bonding agent. The method can further comprise the step of pressing the folded marginal portion of each strip against the one side of the respective central portion.

The method preferably further comprises the step of making the web, preferably by interlacing first filamentary material having a first melting point with a second filamentary material having a lower second melting point and forming part of marginal portions of the strips.

The method preferably also comprises the step of advancing the web and the strips in a predetermined direction along a predetermined path. The subdividing step is carried out in a first portion of such path, and the folding and securing steps are preferably carried out in a second portion of the path closely adjacent and downstream of the first portion of the path. The advancing step can include exerting upon the strips a pull in the predetermined direction in a third portion of the path downstream of the second portion.

The folding step can include converting each marginal portion and the adjacent part of the respective central portion into an elongated loop, and such method can further comprise the step of introducing at least one elongated thread or strip of a material having a low melting point into each of the loops prior to the securing (particularly heat-sealing) step.

The aforementioned pressing step can include ironing the folded marginal portions against the respective central portions subsequent to the securing step.

The method can also comprise the step of subjecting the strips to at least one additional or follow-up treatment following the folding step. Such additional treatment can include smoothing the strips in the presence of heat, and such smoothing step can be carried out simultaneously with the securing step. The additional treatment can include, or can further include, reheating the folded marginal portions of each strip and pressing the reheated marginal portions against the respective central portions.

The step of making the web can include providing the web with tubes or hoses (i.e., making certain portions of the thus obtained fabric tubular) each of which forms part of a marginal portion and of the respective central portion. The folding step then comprises folding each of the tubes into an elongated loop.

The step of making the web can comprise providing the web with weakened zones intermediate the marginal portions and the respective central portions to facilitate folding of the marginal portions of each strip over the one side of the respective central portion. If the making step includes interweaving a plurality of longitudinally extending parallel warp threads with a plurality of transversely extending weft threads, the step of providing the web with weakened zones can include increasing the mutual spacing of neighboring warp threads intermediate the marginal portions and the respective central portions.

At the present time, the securing step preferably includes contacting the folded marginal portions of the strips with heating elements.

The novel features which are considered as characteristic of the invention are set forth in particular in the appended claims. The improved method itself, however, together with additional features and advantages thereof, will be best understood upon perusal of the following detailed description of certain presently preferred specific embodiments with reference to the accompanying drawing.

BRIEF DESCRIPTION OF THE DRAWING

FIG. 2 is an enlarged transverse sectional view of the web as seen in the direction of arrows from the line II—II of FIG. 1;

FIG. 3 is an enlarged transverse sectional view of the strips as seen in the direction of arrows from the line III—III of FIG. 1;

FIG. 4 is a transverse sectional view of a strip with marginal portions which are folded over one side of the central portion of the strip;

FIG. 5 is a similar transverse sectional view of a strip during a further stage of treatment of its marginal portions;

FIG. 6 is a similar transverse sectional view showing the strip during another stage of treatment of its marginal portions;

FIG. 7 is a view similar to that of FIG. 2 but showing a different web;

DESCRIPTION OF PREFERRED EMBODIMENTS

Figure 1:
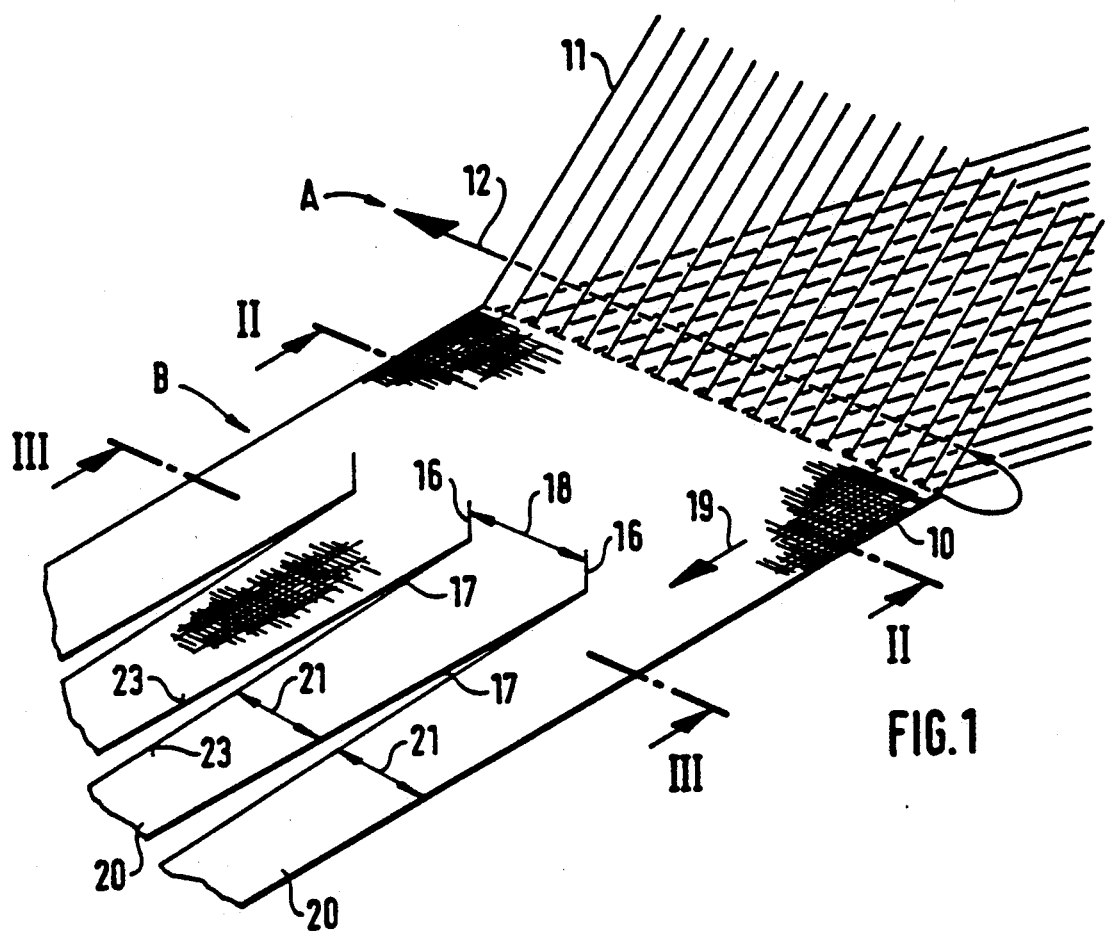
FIG. 1 is a fragmentary perspective view of a woven web which is in the process of being subdivided into four elongated strips of coherent panels by a row of three heated subdividing elements.

FIG. 1 shows a portion of a freshly woven web 10 of textile material which is a so-called broad fabric or broad-width fabric. However, it is equally within the purview of the invention to make and process other types of webs, e.g., webs constituting knitwear. The illustrated woven web 10 is obtained by interlacing longitudinally extending parallel warp threads or yarns 11 with transversely extending weft threads or yarns in a manner not forming part of the present invention. The weft of the web 10 includes one or more weft threads 12 which extend across the entire width of the web 10 and constitute a so-called ground weft or binding pick (also called bottom shoot or ground pick) of the web, and several shorter weft threads 14 (shown in FIG. 2) which together constitute a figure weft or figuring filling (also called figuring weft, pattern weft or patterning weft). The shorter weft threads 14 may but need not have the same color. The weaving station where the web 10 is made is denoted by the character A, and such station is immediately followed by a subdividing or severing station B where the freshly formed web 10 is subdivided into four elongated parallel strips 20 each of which has two elongated parallel marginal portions 23 and a central portion 127 (FIGS. 2 and 4) between the respective marginal portions.

The backing fabric, ground fabric or substrate 15 which includes the warp threads 11 and the weft threads 12 has a cloth face or right side 28 which is provided with the woven design or weave pattern 13 (FIG. 2). The other side 27 of the substrate 15 (namely the so-called fabric back or cloth back) is adjacent to floating or extended portions of the threads 14 forming the woven design 13 at the right side 28 of the substrate 15. The woven designs 13 repeat themselves in the longitudinal direction of the strips 20 so that each such strip can be said to constitute a series of coherent panels in the form of labels for garments or the like. The direction of continuous advancement of the warp threads 11, of the web 10 and of the strips 20 is indicated by arrow 19.

The means for subdividing the web 10 into four identical strips 20 comprises three heated severing or subdividing elements 16 in the form of wires which together form a row extending transversely of the direction (arrow 19) of advancement of the web 10 and subdivide the web into strips each of which has an initial width 21 (FIGS. 1 and 3) corresponding to mutual spacing 18 of neighboring elements 16 of the aforementioned row and exceeding the desired or optimum (predetermined) width 39 (FIG. 6) of a label or a series of coherent labels. At least certain portions of the threads 11, 12, 14 consist of meltable or fusible filamentary material, at least in the regions where the web 10 is subdivided by the wire-like heated severing or subdividing elements 16 (hereinafter called wires for short). As the web 10 advances in the direction of arrow 19, the wires 16 make cuts 17 to subdivide the web into four strips 20.

The marginal portions 23 of the thus obtained strips 20 are not frayed because they tend to develop the aforediscussed fused beads (except at the outer edges of the two outer strips 20, i.e., at those edges which are remote from the wires 16). As already mentioned above, those marginal portions 23 which are adjacent and are separated from each other by the wires 16 are likely to harden and often develop a rather pronounced sawtooth profile which is undesirable when the strips 20 are to be subdivided into labels for the application to garments and the like.

FIGS. 2 and 3 show that the warp threads 11 can include or alternate with special threads or yarns 74 which form part of the substrate 15 and are provided in those regions 22 of the web which constitute the marginal portions 23 of discrete strips 20. The melting point of the material of special threads 74 is lower than that of the warp threads 11 and weft threads 12, 14; such special threads are preferably incorporated into the substrate 15 if the apparatus for making and processing the strips 20 is constructed in a manner as shown in FIGS. 11 to 16.

One finished product (namely a strip of coherent labels) is shown in FIG. 6, as at 30.

The next step of converting the strips 20 into finished products 30 includes folding the marginal portions 23 of each strip 20 over or against the backs 27 of the respective central portions 127 (arrows 29 in FIG. 4) along longitudinally extending fold lines 24 so that each of the thus folded marginal portions 25 overlies the adjacent portion of the respective central portion 127. The width 26 of each folded marginal portion 25 equals one-half the difference between the widths 21 and 39. The thus folded marginal portions 25 are provided with loops having bights or apices 31 at the respective fold lines 24 (FIGS. 4 to 6). Thus, the fused bead (if any) of each folded marginal portion 25 comes into abutment with the back 27 of the respective central portion 127 at a reasonably large distance 32 (FIG. 4) from the respective fold line 24.

Figure 8:
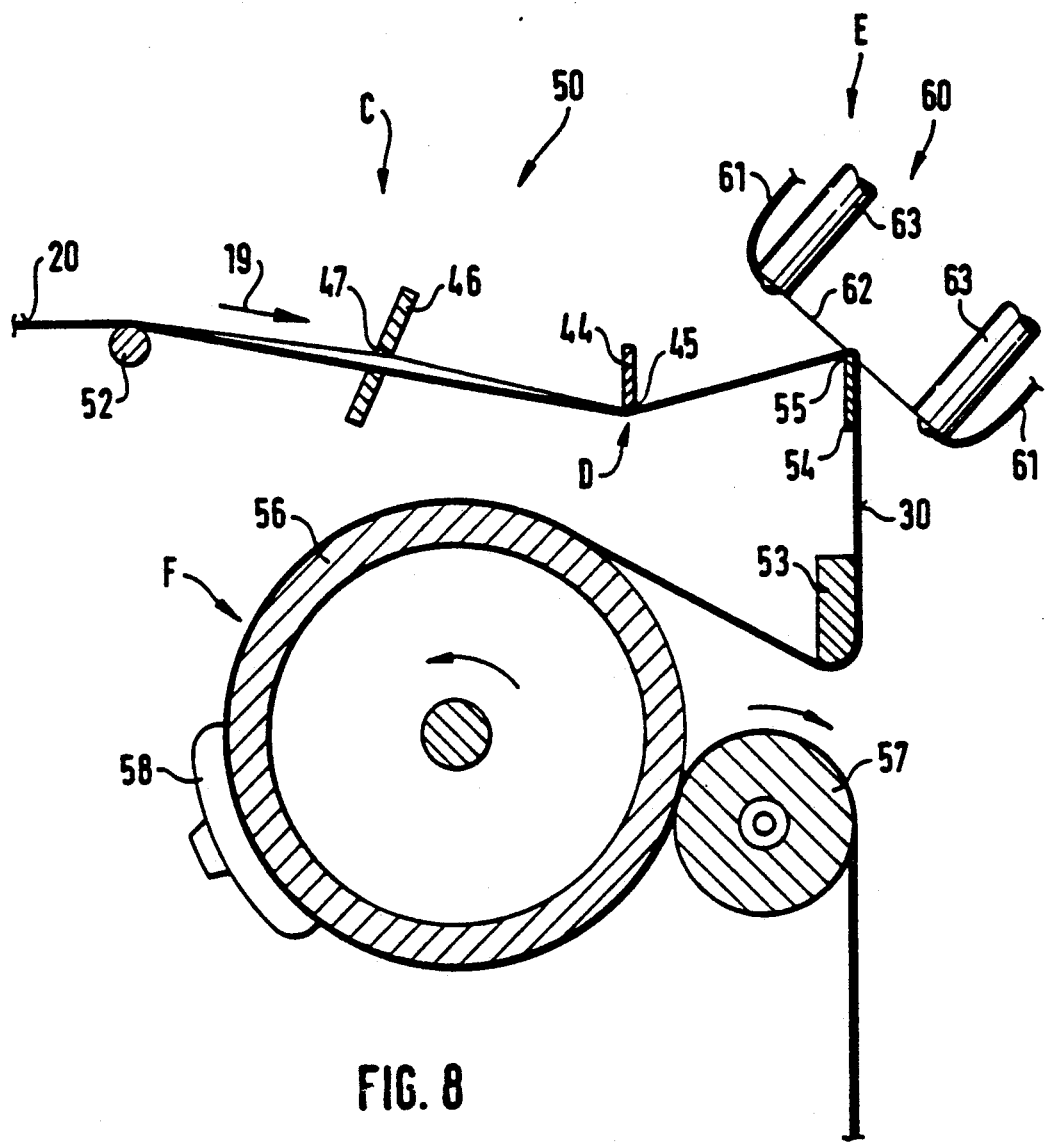
FIG. 8 is a schematic fragmentary longitudinal sectional view of a first apparatus which can be utilized for the practice of the improved method, the section being taken in the direction of arrows from the line VIII—VIII of FIG. 9.

The severing or subdividing station B (for the wires 16) is preferably immediately followed by the just discussed folding station (at C and D in FIG. 8) which, in turn, is preferably immediately followed by a securing or bonding station E (FIG. 8). The latter is followed by an advancing station F where the finished products 30 are subjected to a pull in the direction of arrow 19 in order to advance the web 10 and its originally formed strips 20 as well as the finished strips or products 30 past the wires 16, thereupon past the folding instrumentalities at the stations C, D, past the securing means at the station E and on to a further station (not shown) where the finished products 30 can be collected on a common spool or on discrete bobbins or are subdivided into discrete panels (e.g., labels for use on garments and the like).

The securing or bonding operation involves attachment of each folded marginal portion 25 to the back 27 of the respective central portion 127. To this end, the folded marginal portions 25 are heatsealed to the adjacent edges of the respective central portions 127, for example, by relying on the low melting point of the additional warp threads 74. The arrangement can be, and preferably is, such that the folded marginal portions 25 are brought into and are secured in large surface-to-surface contact with the back 27 as shown at 37 in FIG. 6. However, it is equally possible that (in addition to or in lieu of heat-sealing) the folded marginal portions 25 be bonded to the back 27 of the respective central portion 127 by resorting to a suitable adhesive. Still further, the additional threads 74 of FIGS. 2 and 3 can be omitted or used jointly with threads, yarns and/or strips (not specifically shown) of a filamentary or other material having a low melting point and being positioned adjacent the backs 27 of the central portions 127 so as to be overlapped by the folded marginal portions 25 during the making of loops with bights 31.

FIG. 5 shows two reheating implements 33 which are or can be brought into mere point contact with successive increments of advancing folded marginal portions 25 in order to heat the additional threads 74 and/or the aforementioned threads or strips in the loops of the marginal portions 25 to (or at least close to) the melting point so that the threads 74 and/or the strips or threads in the loops of folded marginal portions 25 flow and form fused zones at 37 to preferably bond the entire marginal portions 25 (or nearly the entire marginal portions 25) to the adjacent regions of the respective central portion 127.

The locations where the melting begins are indicated at 23′ in FIG. 5. It is clear that the heating action of reheating implements 33 can be sufficient to further ensure at least partial melting or fusing of other threads in the regions at 23′ and further on toward the bights 31 of the corresponding folded marginal portions 23.

The flowing material of the threads penetrates into the interstices of the folded marginal portions 25 and of the respective central portions 127, particularly as a result of the application of pressure in the direction of arrows 35 (FIG. 6) in order to iron the folded and secured marginal portions 25 and the adjacent zones of the central portions 127. The finished edges 36 of a product 30 have looped outermost portions and inner portions which are reliably bonded to each other. The application of pressure in the direction of arrows 35 causes the aforediscussed fused beads to disappear as a result of the making of flat finished edges 36 which are relatively smooth and are highly unlikely to damage the garments and/or to cause bruises, sores or other damage to the skin. At least some of the molten material is actually sucked into the interstices of the folded marginal portions 25 and/or into the interstices of adjacent regions of the central portion 127 during the application of heat by the reheating implements 33.

The application of pressure in the direction of arrows 35 is preferably accompanied by additional reheating of the strips 20 by heating implements or elements 38 (FIG. 6) which can form a row extending transversely of the paths of strips 20 to fix, iron or smoothen the entire product 30 prior to winding or prior to subdivision into discrete panels. The reheating step by elements or implements 38 can take place simultaneously with, prior and/or subsequent to the application of heat at 33.

If desired or necessary, the product 30 can be finished or sized or similarly treated with a chemical and/or other finishing agent or merely by hot pressing. Such additional treatment can be carried out in addition to or in lieu of reheating at 38.

The heating elements or implements 33, 38 can constitute irons which are moved into direct contact with the adjacent portions of the strips 20 and/or finished products 30. Alternatively, or in addition to irons, the elements or implements 33 and/or 38 can include heated rollers. Examples of suitable heating elements or implements are shown in FIGS. 8–10 and 11–16. It is equally possible to rely on heating by resorting to electromagnetic radiation, e.g., with infrared light. Furthermore, some or all of the elements or implements 33 and/or 38 can constitute or include ultrasonic heaters or nozzles which discharge jets of hot air or another fluid medium.

If the material of threads which are used to make the products 30 is not meltable or has a high melting point, the securing step and/or the pressing or ironing step can include the application (spraying) of pulverulent bonding material and/or soaking of marginal portions 23 with liquid bonding material. The bonding material is thereupon caused to reliably secure the folded marginal portions 25 to the back 27 of the respective central portion 127 as a result of heating and/or other treatment. It is equally possible to employ chemical bonding agents. All that counts is to ensure that the folded marginal portions 25 are reliably secured to the back 27 of the respective central portion 127 so that the edges of the finished product 30 are relatively smooth and that the width 39 of such product matches or closely approximates the desired width of a label or the like. The exact nature of the securing step will depend upon a host of parameters, such as the intended use of the ultimate product, the desired strength of the bond between folded marginal portions 25 and the central portion 127, the appearance of the edges 36 of the ultimate product, the desired stiffness or smoothness of the edges 36 and/or others.

It is often desirable to render the web 10 readily foldable or pliable in the region of each fold line 24. This can be achieved, for example, in a manner as shown in FIGS. 2-3 or in a manner as shown in FIG. 7. FIGS. 2 and 3 show that certain portions of the web 10 constitute so-called hollow webs 40 (also called tubular fabric or annular fabric) in the form of tubes or hoses each of which has two substantially mirror symmetrical halves or layers 41. Such hollow webs 40 can be more readily folded midway across their layers 41 to form loops with bights 31 each of which includes portions of both layers 41 of the respective web 40.

Figure 11:
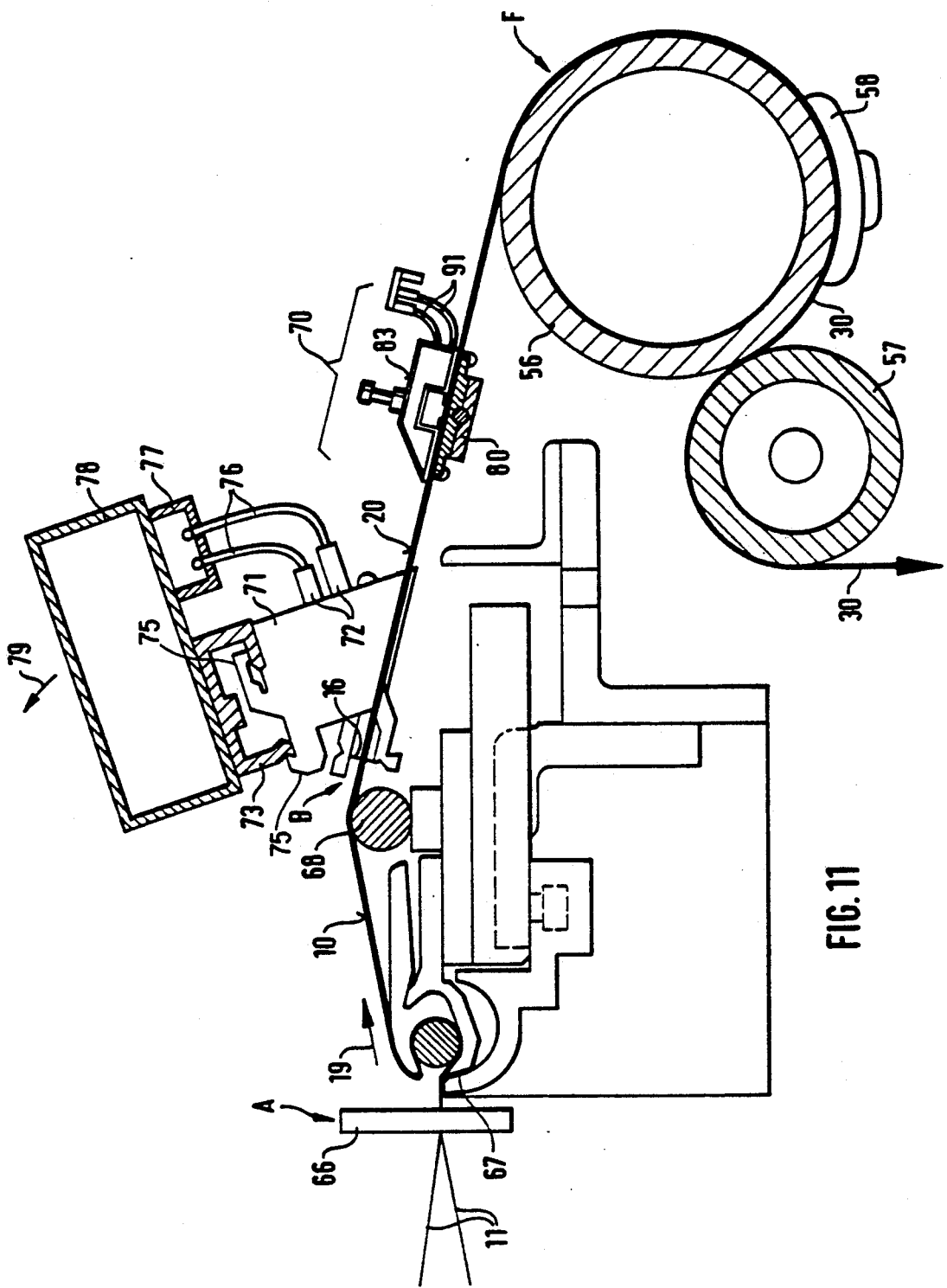
FIG. 11 is a fragmentary longitudinal sectional view of a second apparatus.

FIG. 7 shows a modified web 10' wherein the substrate 15 is weakened by increasing the mutual spacing of certain parallel warp threads, namely, in the regions 40' of fold lines 24. The weakened zones are shown at 42. This can be readily achieved with the loom reed 66 which is shown in FIG. 11 and which does not receive any warp threads 11 in the regions of weakened zones 42 so that there develop so-called reed-fills or reed drawings-in. Additionally, or in lieu of increasing the mutual spacing of warp threads 11 in the regions of weakened zones 42, the machine which makes the web 10' can be provided with means for removing the floating figure wefts 14' at the back of the substrate 15 of the web 10'. The floating figure wefts 14' can be removed by burning, by melting and/or in any other suitable way. This also renders the material of the web 10' more readily pliable along the fold lines 24.

Figure 9:
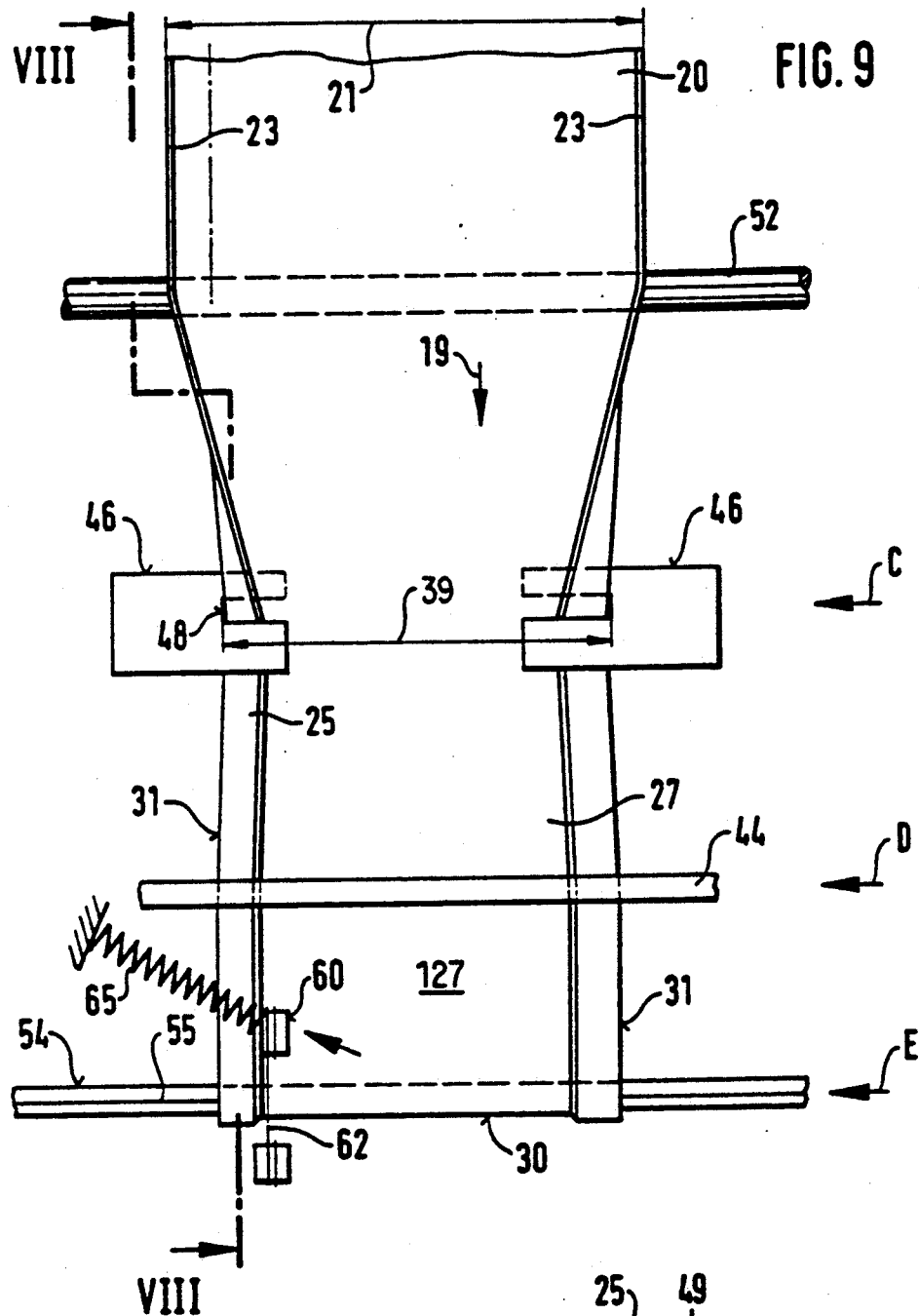
FIG. 9 is a plan view of the apparatus which is shown in FIG. 8.

FIGS. 8 and 9 show certain details of a first apparatus 50 which can be used for the practice of the aforedescribed method. That portion of the apparatus 50 which is shown in FIGS. 8 and 9 can be used to treat the strips 20 and their marginal portions 23 (as well as folded marginal portions 25) in a manner as shown in FIGS. 4 to 6. The apparatus 50 preferably is, but need not be, integrated into a loom, such as the loom of FIG. 1.

The strips 20 which are formed by the wires 16 are advanced in the direction of arrow 19 and first pass over a deflector 52 before reaching the pronounced edge 45 at the lower end of a stationary guide 44 which serves to complete the folding of marginal portions 25 over or against the backs 27 of the corresponding central portions 127. FIG. 9 merely shows a single strip 20 which advances from the severing or subdividing station B past the combined folding station C, D toward the securing station E. Prior to reaching the edge 45 of the guide 44, the already (at least partially) folded marginal portions 25 of the strip 20 advance through a folding member 46 which has two slots 47 (FIG. 10) which causes the respective marginal portions 23 to be folded along the respective fold lines 24 in the direction of arrows 29 (FIG. 4). The slots 47 of the folding member 46 are mirror images of each other with reference to a vertical plane extending in the direction of arrow 19 midway between the originally unfolded marginal portions 23 and thereupon between the folded marginal portions 25. The lateral surfaces 49 bounding the slots cause conversion of unfolded marginal portions 23 into folded marginal portions 25. The bights 31 of the looped and folded marginal portions 25 are adjacent the bottom surfaces 48 in the respective slots 47 of the folding member 46. The distance between the two bottom surfaces 48 of a folding member 46 corresponds to the predetermined width 39 of the finished product 30. The apparatus of FIGS. 8 and 9 comprises four discrete folding members 46, one for each strip 20. Such discrete folding members can form part of a single strip-shaped component which extends transversely of the direction (arrow 19) of advancement of the strips 20 toward the stations E and F. The width 43 of each slot 47 is selected with a view to ensure adequate folding of marginal portions 23, i.e., so that each folded marginal portion 25 either contacts or is closely adjacent the back 27 of the respective central portion 127. The folding members 46 are located at the part C, and the strip 44 is located at the part D of the combined or composite folding station.

The guide 44 can constitute a one-piece component or can be one of four discrete guides, one for each strip 20. It is also possible to employ two guides, one for one pair and the other for the other pair of strips 20. The edge 45 of the guide 44 ensures that the folded marginal portions 25 abut the back 27 of the respective central portion 127.

Figure 10:
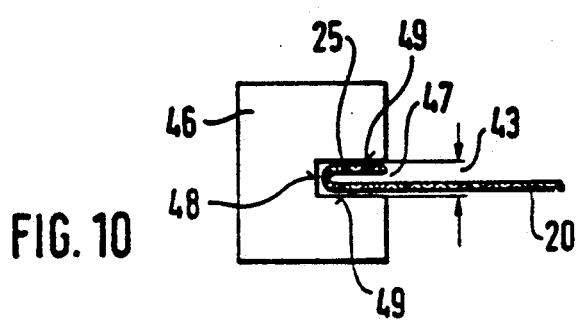
FIG. 10 is an enlarged view of a detail in the apparatus of FIGS. 8 and 9.

The guide 44 cooperates with a further guide 54 having a rather pronounced edge 55 to further ensure that each folded marginal portion 25 abuts the back 27 of the respective central portion 127 at the time the marginal portions 25 are reheated by wire-like reheating elements or components 62 corresponding to the components 38 and/or 33 shown in FIGS. 5 and 6. The deflector 52 cooperates with the guides 44 and 54 to impart to the corresponding portion of the path for the strips 20 a substantially Z-shaped configuration. The securing station E is immediately followed by a breast beam 53 which cooperates with an advancing or drawing roll 56 to change the direction of advancement of finished products 30. The advancing roll 56 cooperates with a biasing or presser roll 57 to define a nip for the products 30 and to produce a further ironing or pressing action across the full width of each product 30 (if such additional pressing or ironing action is necessary or desirable). The directions in which the rolls 56, 57 rotate when the apparatus of FIGS. 8 to 10 is in use are indicated by arrows. At least one of these rolls is driven in a manner not forming part of the present invention.

The heating or securing unit 60 at the securing station E employs the aforementioned wires 62 which come in direct contact with or are immediately adjacent the folded marginal portions 25 of the strips 20. Each wire 62 is installed in a holder 63 which carries conductors 61 serving to connect the wires with a suitable source (not shown) of electrical energy. The wires 62 soften the threads or filaments of the folded marginal portions 25. FIG. 9 shows tension springs 65 which are used to bias the wires 62 against the respective marginal portions 25 to enhance the heating and softening action.

The advancing roll 56 preferably cooperates with a fixing or setting unit 58 which can subject the finished products 30 to a moderate heating action such as might be necessary or desirable to iron the folded and secured marginal portions 25 and, if necessary, the intermediate portions of the products 30. The fixing unit 58 can perform the function of heating implements or elements 38 which are shown in FIG. 6.

FIGS. 11 to 16 illustrate a modified apparatus which can be used in lieu of the apparatus 50 of FIGS. 8 to 10 and is (or can be) incorporated into a web making machine. That portion 70 of the apparatus of FIGS. 11 to 16 which is used to fold the marginal portions 23 of the strips 20 and to secure the folded marginal portions 25 to the respective central portions 127 preferably constitutes a self-sustaining unit, attachment or tool which is located downstream of the subdividing or severing station B and upstream of the advancing station F. The attachment 70 can perform the functions of those instrumentalities which are located at the stations C, D and E of the apparatus 50 of FIGS. 8 to 10. In order to facilitate folding of marginal portions 23 in the attachment 70, the apparatus of FIGS. 11 to 16 preferably comprises means for initiating the folding of marginal portions 23 at the severing or subdividing station B, namely in the region of a composite holder 71 for heating wires 16. The apparatus of FIGS. 11 to 16 is installed between a loom reed 66 of the web making machine (web making station A) and the advancing or drawing roll 56.

The reference character 67 denotes in FIG. 11 a fabric spreader or stretcher which is located downstream of the reed 66 and is followed by a deflector 68.

The holder 71 for the heating wires 16 is or can be made of a plastic material and has claws 75 which serve to couple it to a rail-shaped support 73. The latter extends transversely of the direction which is indicated by the arrow 19 and is mounted on a main support 78 which is pivotable in and counter to the direction of arrow 79. The holder 71 for the wires 16 is shiftable along the rail 73 to ensure that its wires 16 are properly spaced from the longitudinal edges of the web 10. The holder 71 can include a discrete section for each wire 16, and each such section is then individually movable along the rail 73 to ensure that the mutual spacing of heated wires 16 corresponds to that which is shown at 18 in FIG. 1.

Each wire 16 is connected with two electrical conductors 72 which can be embedded in the plastic material of the holder 71 and are connected to a conductor 77 on the main support 78 by electric cables 76. Means (not shown) can be provided to reliably but separably fixing each section of the holder 71 to the rail 73 in a selected position.

The main support 78 is connected with the main frame of the web making machine by two or more levers (not shown) which enable the main support to pivot in and counter to the direction which is indicated by the arrow 79. FIG. 11 shows the main support 78 and the wires 16 in operative positions. When pivoted in the direction of arrow 79, the main support 78 lifts the wires 16 above and away from the path for the web 10.

Figure 12:
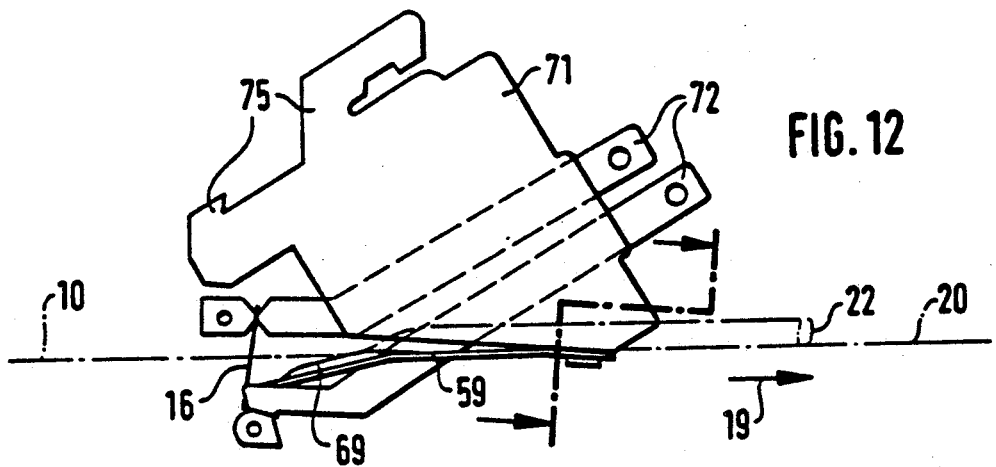
FIG. 12 is an enlarged view of a detail in the apparatus of FIG. 11.
Figure 13:
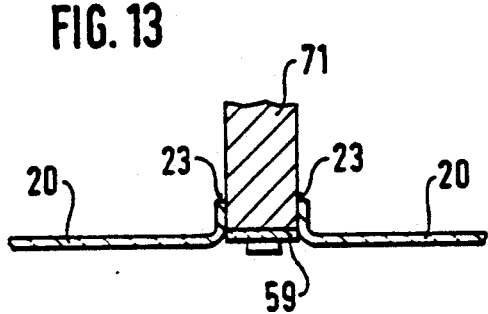
FIG. 13 is an enlarged fragmentary transverse sectional view substantially as seen in the direction of arrows from the line XIII—XIII of FIG. 12.
Figure 14:
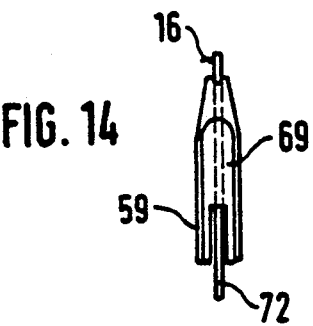
FIG. 14 is an enlarged plan view of another detail in the apparatus of FIG. 11.

The manner in which the holder 71 causes the marginal portions 23 of the strips 20 to undergo a preliminary or initial folding is shown in FIGS. 12, 13 and 14. The underside of the holder 71 is provided with narrow prefolding members in the form of profiled tongues 59 (one shown in each of FIGS. 12 to 14) each having a rear portion which is affixed to the respective section of the holder 71 by a screw, a bolt or in any other suitable way. The pointed front end of each tongue 59 extends forwardly and downwardly away from the respective section of the holder 71. Such front ends of the tongues 59 are pointed as can be seen in FIG. 14, and the front ends extend downwardly beneath the plane of the adjacent portion of the path for the web 10 (the web is indicated in FIG. 12 by phantom lines). The tip of each tongue 59 is close to the respective wire 16 and extends to the lower conductor 72 for such wire. The main purpose of the tips of tongues 59 is to initiate the folding of marginal portions 23 when the web making machine is set in operation. Such tips are located immediately or closely downstream of the respective wires 16 and partially fold the freshly separated marginal portions 23 of two neighboring strips 20 in a manner as shown in FIG. 13. Partial folding of one of the marginal portions 23 of FIG. 13 takes place simultaneously with partial folding of the adjacent marginal portion 23. The upwardly folded zones of the marginal portions 23 are mirror images of each other with reference to the plane of separation of the respective strips 20, i.e., with reference to the plane of the respective cut 17 (FIG. 1).

In order to ensure more satisfactory guidance of the partially folded marginal portions 23, each tongue 59 is provided with a groove, channel or dent 69 (FIGS. 12 and 14). Such channels perform the additional function of stiffening the tips of the respective tongues 59. The tongues 59 lift the free edges of marginal portions 23 against the respective sides of corresponding sections of the holder 71 whereby such sections proceed to further fold the marginal portions 23 so that the folded zones of the marginal portions are located in substantially vertical planes (FIG. 13). The holder 71 and its tongues 59 oppose the tendency of stretched strips 20 to maintain their marginal portions 23 in the planes of the respective central portions 127. In fact, the marginal portions 23 of freshly formed strips 20 (i.e., immediately downstream of the wires 16) often exhibit a tendency to curl downwardly, i.e., a tendency to flex toward the right or cloth face of the undivided web.

Figure 15:
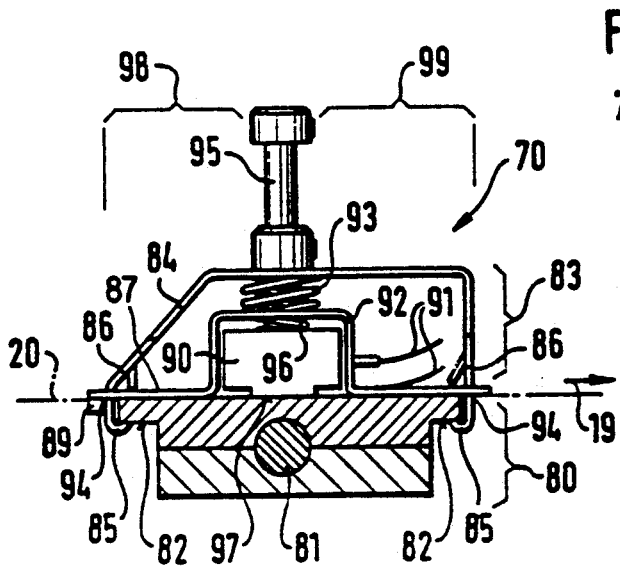
FIG. 15 is an enlarged partly elevational and partly longitudinal vertical sectional view of a further detail in the apparatus of FIG. 11.
Figure 16:
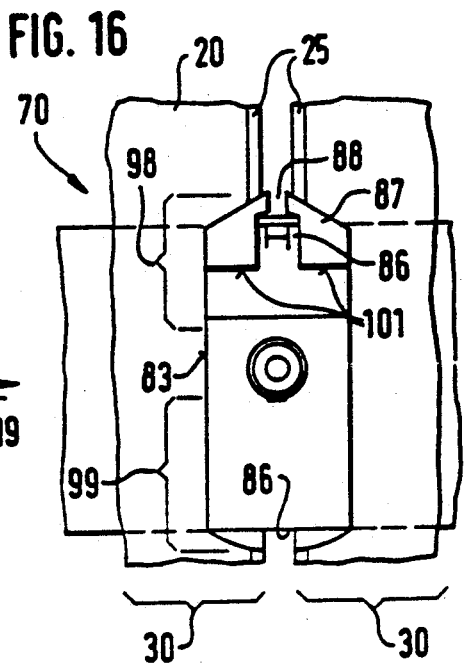
FIG. 16 is a plan view of the structure which is shown in FIG. 15, further showing portions of two neighboring strips.

Final folding of prefolded marginal portions 23 (i.e., their conversion into fully folded marginal portions 25) and bonding of folded marginal portions 25 to the central portions 127 of the respective strips 20 takes place in the attachment 70 the details of which are shown in FIGS. 15 and 16.

The attachment 70 comprises a plate-like base 80 which is assembled of two parts flanking an electrically heatable cartridge 81. The upper part of the base 80 is undercut, as at 82, so that the base has a substantially T-shaped cross-sectional outline. This base extends transversely across the path of the strips 20 with partially folded marginal portions 23. The strips 20 overlie and slide along the upper side or surface of the base 80.

The base 80 is disposed at a level below four specially designed shoes 83 one of which is shown in detail in FIGS. 15 and 16. Each shoe 83 is shiftable along the base 80 in a direction at right angles to the direction of advancement of the strips 20 so that it comes to rest in a position as shown in FIG. 16, namely between two neighboring strips 20. The shoes 83 comprise means for completing the conversion of marginal portions 23 of strips 20 into folded marginal portions 25 as well as means for bonding the folded marginal portions 25 to the central portions 127 of the respective strips 20.

Each shoe 83 comprises a substantially inverted U-shaped carrier 84 having two downwardly extending legs 85 which engage and bear against the undercut portions 82 of the base 80 so that the latter provides a track for movement of the carrier 84 transversely of the adjacent portion of the path for the strips 20. The material of the carrier 84 is preferably elastic so that the suitably configured (e.g., claw-shaped) lower end portions of the legs 85 can bear against the adjacent portions of the base 80 and can maintain the respective shoe 83 in a selected position.

The legs 85 of each carrier 84 are provided with cutouts 101 to form relatively narrow guide elements 86 in the form of lugs or prongs for a pressing or biasing plate 98 the end portions of which project laterally beyond the respective guide element. The two exposed ends of each plate 87 are bifurcated, as at 88, and the prongs of such bifurcated ends flank the respective guide elements 86. The prongs at the front end of each plate 87 are bent downwardly so as to form projections 89 which guide the partially folded marginal portions 23 of the adjacent strips 20.

The median portion of each plate 87 carries a block-shaped heating element 90 which is connected with an energy source by conductors 91 and is surrounded by a substantially U-shaped yoke or housing 92 of the respective plate 87. The housing 92 is acted upon by a coil spring 93 which reacts against the carrier 84 and urges the plate 87 downwardly toward the upper side of the base 80. When the shoe 83 is detached from the base 80, the spring 93 urges the plate 87 against the projections at the lower ends of the guide elements 86.

The upper side of each heating element 90 is connected with a bolt-shaped actuating element 95 which extends through an opening of the respective housing 92 and through an opening in the central part or web of the respective U-shaped carrier 84. The heating element 90 is biased toward the base 80 by a further coil spring 96 which reacts against the housing 92 or against the web of the carrier 84. The coil spring 93 extends through the opening of the housing 92 and reacts against the web of the carrier 84. The underside of each heating element 90 is provided with a relatively narrow strip contacting and heating portion 97.

The reference characters 98 and 99 denote the two end portions of the plate 87. The end portions 98, 99 and the contacting portion 97 on the one hand, and the upper side of the base 80 on the other hand, define a passage for the partially folded zones of the marginal portions 23. Completion of folding (conversion of marginal portions 23 into folded marginal portions 25) takes place at 98, and the thus formed folded marginal portions 25 are immediately pressed against the respective central portion 127. Successive increments of the folded marginal portions 25 then reach the heating element 90 (i.e., the contacting portion 97) which cooperates with the heated base 80 (the base is heated by the cartridge 81) to melt the material of the folded marginal portions 25 and (if necessary) the material of adjacent zones of the respective central portions 127). At the very least, the heating action of heating element 90 and base 80 suffices to at least partially melt the additional threads 74 of FIGS. 2 and 3 in order to establish a reliable seal between the folded marginal portions 25 and the respective central portions 127. The freshly secured folded marginal portions 25 then reach the other half 99 of the plate 87 which applies a pressing or ironing force and cools the adjacent material to ensure rapid solidification of fused material and the establishment of strong bonds between 25 and 127.

The finished products 30 advance beyond the respective shoes 83 to reach the advancing and presser rolls 56, 57 and to be treated (if necessary) at 58 in a manner as described above in connection with the apparatus 50.

FIG. 11 shows that the conductors 91 which extend from the shoes 83 are connected with a conductive rail or bar 100 which, in turn, is connected with a source (not shown) of electrical energy. The conductors 91 are sufficiently long to permit movements of the shoes 83 relative to the bar 100 or the conductors 91 can move along the bar 100 jointly with the respective shoes 83.

If the manufacturer wishes to change the width of folded marginal portions 25, the illustrated shoes 83 are replaced with a different set of shoes. Thus, the apparatus of FIGS. 11 to 16 can be furnished with or more sets of shoes in order to enable the maker to turn out products 30 having different widths and folded and secured marginal portions 25 of desired width. Each shoe 83 can be readily separated from the base 80 by pushing it beyond the one or the other end of the base or by spreading the legs 85 of the respective carriers 84 apart in order to disengage such legs from the undercut portions 82 of the base 80.

It is further clear that the apparatus of FIGS. 11 to 16 can constitute a separate unit which need not be directly or even indirectly coupled to the making machine. Thus, the machine defining the making station A and the subdividing or severing station B can constitute a first independent unit, and the apparatus shown in the right-hand portion of FIG. 11 and in FIGS. 12-16 can constitute an independent second self-sustaining unit.

The present invention is based on the recognition that it is impractical to experiment with the aforediscussed fused beads along the edges of strips which are obtained by severing a web with heated wires or analogous implements. Thus, it is not necessary to reduce the sharpness of beads which are likely to have a toothed profile; instead, the present invention provides that the strips 20 which are obtained by severing the web 10 or 10' with heated implements 16 or the like be considered an intermediate product which is thereupon further processed by folding the marginal portions 23 of the strips 20 over the respective central portions 127 and by securing the folded marginal portions 25 to such central portions. This, especially when combined with fusing or melting of the folded marginal portions 25 during securing to the respective central portions 127, either eliminates the beads or places them far away from the edges of the final products 30 so that the beads are much less likely to damage a garment and/or to affect the skin of the wearer. All that is necessary is to make the intermediate products (strips 20) somewhat wider than the final products 30 and to take advantage of the difference between the two widths in the aforedescribed manner, i.e., by folding the marginal portions 23 against or over and by securing the folded marginal portions 25 to the respective central portions 127.

It has been found that fusing of the folded marginal portions 25 normally eliminates any and all beads which happen to develop as a result of severing of the web 10 or 10' with heated wires 16 or with equivalent subdividing or severing implements because the material of the beads is absorbed by the central portions 127 and/or by the folded marginal portions 25. Moreover, the edges of the finished products 30 are smooth and relatively soft which is desirable in many instances, especially when the ultimate products 30 constitute chains of coherent labels.

Tensioning of the web 10 or 10' and of the strips 20 by the advancing means 56, 57 also contributes to the quality of the folding and securing operations. Such tensioning is desirable at the subdividing station B where the wires 16 are much more likely to make clean cuts 17 if the web is under at least some tension. Moreover, tensioning of the strips 20 is desirable at the stations C, D in the apparatus 50 or at the corresponding station of the apparatus which is shown in FIGS. 11 to 16 because the folding of marginal portions 23 is much more predictable. Furthermore, tensioning of the strips 20 and final products 30 is desirable at the securing station E because this simplifies and promotes the bonding of folded marginal portions 25 to the respective central portions 127. As a rule, the width of folded marginal portions 25 can be in the range of a fraction of one centimeter, e.g., 1-2 mm. Tensioning of the web 10 or 10', of the strips 20 and of the final products 30 further contributes to the appearance and quality of edges of the final products 30.

Since the difference between the width 21 of a strip 20 and the width 39 of a finished product 30 is very small (normally not more than 4 mm), the outlay for additional material is negligible when compared with the difference between the quality of a conventional product and that of the improved products 30.

The edges of each finished product 30 can be said to resemble tubular or annular fabric which is achieved by the simple expedient of folding the marginal portions 23 of the strips 20 in the aforediscussed manner. In a standard machine, the same effect could be obtained only by resorting to a much more complex tape loom or narrow fabric loom.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of converting an elongated web of filamentary material into chains of coherent panels having a predetermined width, comprising the steps of subdividing the web into a plurality of elongated strips each having a width exceeding said predetermined width, two longitudinally extending marginal portions and a central portion having a width at least approximating said predetermined width; folding the marginal portions of each strip against one side of the respective central portion; securing the thus folded marginal portions of each strip to the respective central portion; and making the web, including providing the web with tubes each of which forms part of a marginal portion and of the respective central portion, said folding step including folding each of the tubes into an elongated loop.

2. A method of converting an elongated web of filamentary textile material into chains of coherent labels which are to be applied to garments and have a predetermined width, comprising the steps of making the web from filaments which are meltable in response to heating, including forming a substrate having a right side and a second side and labels constituted by woven patterns at the right side; subdividing the web into a plurality of elongated strips each having a width exceeding said predetermined width and each having a chain of woven patterns, two longitudinally extending marginal portions, a central portion having a width at least approximating said predetermined width and weakened zones intermediate the marginal portions and the respective central portions to facilitate folding of the marginal portions of each strip over the second side of the respective central portion, said subdividing step immediately following said making step and including heating the web in the regions between the strips at least close to the melting point so that the filaments of marginal portions between the strips are fused to each other and thus prevent fraying of marginal portions between the strips; advancing the web and the strips in a predetermined direction along a predetermined path; folding the marginal portions of each strip against the second side of the respective central portion along the respective weakened zones; and sealing the thus folded marginal portions of each strip to the respective central portion to thus reduce the width of each strip to said predetermined width, said sealing including flattening the folded marginal portions against the respective central portions and fusing the thus flattened marginal portions against the respective central portions.

3. The method of claim 2, wherein said sealing step includes heat-sealing the folded marginal portions of each strip to the respective central portion.

4. The method of claim 2, wherein the making step includes interlacing first filamentary material having a first melting point with a second filamentary material having a lower second point and forming part of marginal portions of the strips.

5. The method of claim 2, wherein, said subdividing step is carried out in a first portion of said path and said folding and sealing steps are carried out in a second portion of said path closely adjacent and downstream of said first portion.

6. The method of claim 5, wherein said advancing step includes exerting upon the strips a pull in said direction in a third portion of said path downstream of said second portion.

7. The method of claim 2, wherein said sealing step includes heat-sealing the folded marginal portions of each strip to the respective central portion, said folding step including converting each marginal portion and the adjacent part of the respective central portion into an elongated loop and further comprising the step of introducing at least one elongated thread of a material having a low melting point into each of said loops prior to said heat-sealing step.

8. The method of claim 2, further comprising the step of ironing the folded marginal portions against the respective central portions subsequent to said securing step.

9. The method of claim 2, further comprising the step of subjecting the strips to at least one treatment following said folding step.

10. The method of claim 9, wherein said treatment includes smoothing the strips in the presence of heat.

11. The method of claim 10, wherein said smoothing step is carried out simultaneously with said sealing step.

12. The method of claim 9, wherein the said treatment includes reheating the folded marginal portions and pressing the reheated marginal portions against the respective central portions.

13. The method of claim 2, wherein said forming step comprises interweaving a plurality of parallel longitudinally extending neighboring warp threads with a plurality of transversely extending weft threads, said step of providing the web with weakened zones including increasing the mutual spacing of neighboring warp threads intermediate the marginal portions and the respective central portions.

14. The method of claim 2, wherein said sealing step comprises contacting the folded marginal portions with heating elements.

15. The method of claim 2, further comprising the step of making said weakened zones, including removing filaments intermediate said marginal portions and the respective central portions.

16. The method of claim 15, wherein said removing step comprises burning the filaments.

17. The method of claim 15, wherein said removing step includes melting the filaments.

18. The method of claim 15, wherein the filaments of the web include filaments which are accessible at said second side and said removing step includes removing selected accessible filaments at said second side.

* * * * *